(12) United States Patent
Choi et al.

(10) Patent No.: US 11,639,860 B2
(45) Date of Patent: May 2, 2023

(54) ABSOLUTE POSITION DETECTION DEVICE AND DETECTION METHOD OF ROTATING BODY USING MAGNETIC MATERIAL

(71) Applicant: KOREA ELECTRONICS TECHNOLOGY INSTITUTE, Seongnam-si (KR)

(72) Inventors: Jun Hyuk Choi, Bucheon-si (KR); Joon Sung Park, Seoul (KR); Jin Hong Kim, Suwon-si (KR); Byong Jo Hyon, Anyang-si (KR); Yong Su Noh, Seoul (KR); Dong Myoung Joo, Bucheon-si (KR)

(73) Assignee: KOREA ELECTRONICS TECHNOLOGY INSTITUTE, Gyeonggi-Do (KR)

( * ) Notice: Subject to any disclaimer, the term of this patent is extended or adjusted under 35 U.S.C. 154(b) by 128 days.

(21) Appl. No.: 17/136,931

(22) Filed: Dec. 29, 2020

(65) Prior Publication Data

US 2022/0018685 A1    Jan. 20, 2022

(30) Foreign Application Priority Data

Jul. 16, 2020 (KR) .......................... 10-2020-0087942

(51) Int. Cl.
| | |
|---|---|
| *G01D 5/14* | (2006.01) |
| *G01D 5/245* | (2006.01) |
| *F16C 41/00* | (2006.01) |

(52) U.S. Cl.
CPC ........... *G01D 5/145* (2013.01); *F16C 41/007* (2013.01); *G01D 5/2452* (2013.01)

(58) Field of Classification Search
CPC ...... F16C 41/007; G01D 5/145; G01D 5/2452
See application file for complete search history.

(56) References Cited

U.S. PATENT DOCUMENTS

| | | | | |
|---|---|---|---|---|
| 2013/0179117 A1* | 7/2013 | Delbaere | ............. | G01D 5/2449 |
| | | | | 702/150 |
| 2017/0322014 A1* | 11/2017 | Jeon | ......................... | G01P 3/44 |
| 2018/0274897 A1* | 9/2018 | Uchida | .................. | G01D 5/145 |

FOREIGN PATENT DOCUMENTS

| | | |
|---|---|---|
| JP | 2011-252826 A | 12/2011 |
| KR | 2013-0094953 A | 8/2013 |
| KR | 10-2014-0138253 A | 12/2014 |

OTHER PUBLICATIONS

Office Action dated Nov. 30, 2021 in Korean Application No. 10-2020-0087939.

(Continued)

*Primary Examiner* — Son T Le
*Assistant Examiner* — Adam S Clarke
(74) *Attorney, Agent, or Firm* — Knobbe, Martens, Olson & Bear, LLP

(57) ABSTRACT

This application relates to an absolute position detection device and detection method of a rotating body using a magnetic material. The device may include magnets coupled to a rotating body and configured to rotate together and having n pole pairs, wherein n is a natural number and (n+1) magnetic materials arranged adjacent to the magnets, spaced apart from each other by a predetermined interval, and configured to rotate together with the rotating body. The device may also include a first Hall sensor spaced apart from the magnets, installed to allow the magnetic materials to rotate in a space between the first Hall sensor and the magnets and configured to output a first signal based on the magnets when the magnetic materials approach the first Hall sensor. The device may further include a controller configured to measure an absolute position of the rotating body using the first signal.

8 Claims, 6 Drawing Sheets

(56) References Cited

OTHER PUBLICATIONS

Office Action dated Jun. 29, 2022 for KR Patent Application No. 10-2020-0087942.
Office Action in co-pending U.S. Appl. No. 17/136,624 dated Apr. 1, 2022 in 9 pages.
Notice of Allowance dated Jul. 27, 2022 in U.S. Appl. No. 17/136,624.

\* cited by examiner

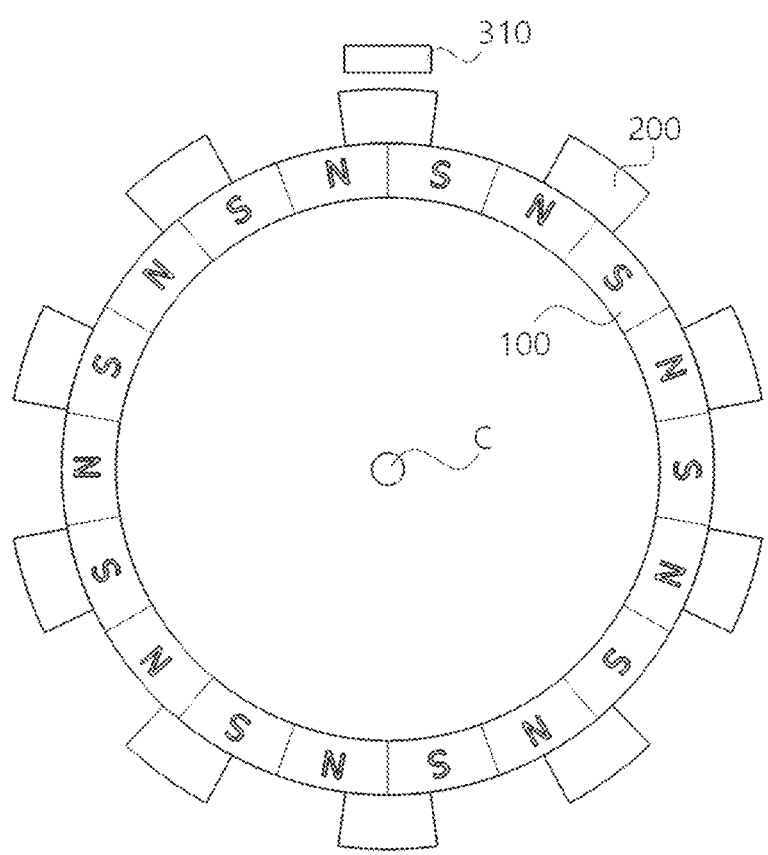

ABSOLUTE POSITION DETECTION DEVICE AND DETECTION METHOD OF ROTATING BODY USING MAGNETIC MATERIAL

CROSS-REFERENCE TO RELATED APPLICATIONS

This application claims priority under 35 U.S.C. § 119 to Korean Patent Application No 10-2020-0087942, filed on Jul. 16, 2020, in the Korean Intellectual Property Office, the disclosure of which is incorporated herein by reference in its entirety.

BACKGROUND

Technical Field

The following disclosure relates to a detection device and a detection method capable of detecting an absolute position of a rotating body, and more particularly, to a device and method capable of detecting an absolute position of a rotating body such as a motor or a vehicle wheel using a magnetic material.

Description of Related Technology

An encoder refers to a sensor that electrically outputs information on a position and a speed of an object that makes a rotational motion or a linear motion. Among types of encoders, an encoder that electrically outputs information on a position or a speed of an object that makes a rotational motion is called a rotary encoder, and encoders may be classified as optical encoders and magnetic encoders according to detection sensors.

Meanwhile, a wheel bearing is a key component that fixes a wheel of a vehicle and minimizes friction loss to enable smooth rotation and supports a weight of the vehicle. The encoder is a key component of an anti-lock brake system (ABS) used in the wheel bearing and generates a square wave speed signal in an ABS ECU to provide signal information such as a rotation speed, rotation acceleration, and the like of a tire.

SUMMARY

An exemplary embodiment of the present disclosure is directed to providing an absolute position detection device and detection method of a rotating body using a magnetic material, capable of detecting an absolute position so as to be applied to various fields, and capable of using a magnetic material having a relatively simple structure.

In one general aspect, an absolute position detection device of a rotating body using a magnetic material includes: magnets coupled to a rotating body and rotating together and having n (n is a natural number) pole pairs; n+1 (n is a natural number) magnetic materials arranged adjacent to the magnets, spaced apart from each other by a predetermined interval, and rotating together with the rotating body; a first Hall sensor spaced apart from the magnet by a predetermined interval, installed to allow the magnetic material to rotate to a space between the first Hall sensor and the magnet and outputting a signal based on the magnets when the magnetic material approaches the first Hall sensor, and a controller measuring an absolute position of the rotating body using the signal output from the first Hall sensor.

The controller may measure the absolute position of the rotating body by connecting the signal output from the first Hall sensor and detecting a primary harmonic with a cycle of one rotation time of the rotating body.

The controller may measure the absolute position of the rotating body by estimating the primary harmonic using at least two of the values of the signal output from the first Hall sensor.

The absolute position detection device may further include: a second Hall sensor installed adjacent to the magnet to detect a change in magnetism according to rotation of the magnet and outputting a signal, wherein the controller may measure the absolute position of the rotating body using the signal output from the first Hall sensor and the signal output from the second Hall sensor.

The magnets and the magnetic materials may be arranged in a direction of a rotation axis.

In addition, the magnets and the magnetic materials may be arranged in an outer circumferential direction about the rotation axis.

In another general aspect, an absolute position detection method of a rotating body using magnets coupled to a rotating body to rotate and having n pole pairs find n+1 (n is a natural number) magnetic materials installed adjacent to the magnets and spaced apart from each other by a predetermined interval includes a) outputting, by a first Hall sensor spaced apart from the magnet by a predetermined interval and installed to allow the magnetic material to rotate to a space between the magnet and the first Hall sensor, a signal based on the magnet when the magnetic material approaches the first Hall sensor; and b) measuring an absolute position of the rotating body by detecting a primary harmonic with a cycle of one rotation time of the rotating body using the signal output from the first Hall sensor.

In b), the absolute position of the rotating body may be measured by estimating the primary harmonic using at least two of the values of the signal output from the first Hall sensor.

The absolute position detection method may further include: a-1) outputting, by a second Hall sensor which is spaced apart from the magnet by a predetermined interval and detects a change in magnetism according to rotation of the magnet, a signal, which is performed between a) and b), wherein the absolute position of the rotating body may be measured by detecting the primary harmony using the signal output from the first Hall sensor and the signal output from the second Hall sensor.

Other features and aspects will be apparent from the following detailed description, the drawings, and the claims.

BRIEF DESCRIPTION OF THE DRAWINGS

FIG. 2 is a schematic diagram of an absolute position detection device of a rotating body using a magnetic material according to a first exemplary embodiment of the present disclosure.

DETAILED DESCRIPTION

Figure 1:
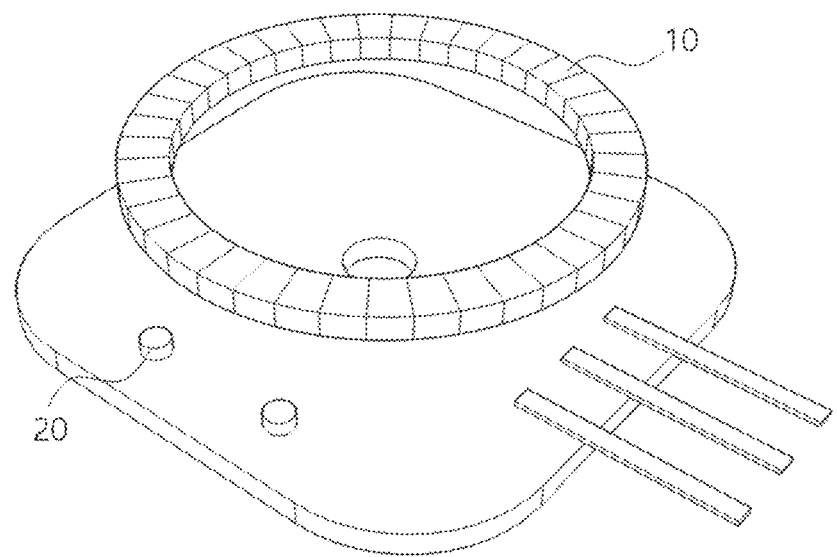
FIG. 1 is an exploded perspective view of a magnetic encoder.

FIG. 1 shows a magnetic encoder applied to a general wheel bearing. As shown in FIG. 1, the magnetic encoder may include a magnet 10 coupled to a rotation axis and rotating together with a rotating body (e.g., wheel) and a rotation detection unit 20 installed adjacent to the magnet 10 and detecting a change in magnetism according to rotation of the magnet 10.

The magnet 10 shown in FIG. 1 includes a plurality of N poles and S poles that are repeatedly and alternately arranged, find the rotation detection unit 20 includes a Hall sensor but does not rotate unlike the magnet 10, detects a change of magnetism by the rotating magnet 10 and provides information such as a rotation direction a rotation speed of the rotating body. A modified magnetic encoder in which multi-pole magnets are configured in two rows to increase resolution has also been introduced, but with the method, it is not possible to detect an absolute position of the rotating body, leading to a problem of a limited application of an application field.

Hereinafter, an exemplary embodiment of an absolute position detection device of a rotating body using a magnetic material according to the present disclosure will be described in detail with reference to the accompanying drawings.

First Embodiment

FIG. 2 schematically shows an absolute position detection device of a rotating body using a magnetic material according to a first exemplary embodiment of the present disclosure.

The absolute position detection device of a rotating body using a magnetic material according to the first exemplary embodiment of the present disclosure may be applied to a wheel bearing of a vehicle or the like as described in the background art, and the rotating body described below may be various types of rotating devices including wheels of a vehicle.

As shown in FIG. 2, the absolute position detection device of a rotating body using a magnetic material according to the first exemplary embodiment of the present disclosure may include magnets 100, magnetic materials 200, a first Hall sensor 310, and a controller.

The magnets 100 are coupled to a rotating body and rotate about a rotation axis C together with the rotating body and have n (n is a natural number) pole pairs. Specifically, in this exemplary embodiment, the magnets 100 are arranged such that N-pole and S-pole magnets are alternately arranged along an imaginary circumference centered on the rotation axis C. In the magnets 100, one N pole magnet and one S pole magnet are alternately arranged. In the magnets 100, a pair composed of one N pole magnet and one S pole magnet disposed adjacent to the corresponding N pole magnet is referred to as one polar pair. In a general encoder, magnets coupled to a rotating body may have 24 pole pairs, i.e., 48 poles, and the magnets 100 of the present disclosure may also have 24 pole pairs, and in this disclosure, for convenience of description, it is assumed that the magnets 100 have 9 pole pairs.

As shown in FIG. 2, the magnetic materials 200 are disposed on the outside of the magnet 100 around the rotation axis C. In the present disclosure, a total of n+1 (n is a natural number) magnetic materials 200 may be arranged to be spaced apart from each other by a predetermined interval on the outside of the magnet 100. That is, in the present disclosure, the magnetic materials 200 may be used in a number one more than the number of pole pairs included in the magnets 100, and since the magnets 100 described above have 9 pole pairs, a total of ten magnetic materials 200 may be arranged outside the magnet 100.

The magnetic material is a material in which internal atoms form a magnetic dipole and align when a magnetic field is applied from the outside. In the present disclosure, the magnetic material serves to expand a magnetic field of the magnets 100 disposed to be adjacent to each other.

As shown in FIG. 2, the first Hall sensor 310 is installed to be spaced apart from the magnet 100 by a predetermined interval. The first Hall sensor 310 may be spaced apart from the magnet 100 to an extent that the aforementioned magnetic material 200 is located therebetween, and when the rotating body rotates, the ten magnetic materials 200 sequentially approach the first Hall sensor 310 and then move away. As described above, since the magnetic material 200 serves to expand the magnetic field of the adjacent magnet 100, the first Hall sensor 310 detects the magnetic field of the magnet 100 and outputs a signal at a point in time when the magnetic material 200 is located in the space between the first Hall sensor 310 and the magnet 100. In this exemplary embodiment, since there are a total of 10 magnetic materials 200, the first Hall sensor 310 outputs a total of 10 signals while the rotating body rotates once.

The aforementioned process will be described in more detail with reference to the drawings.

Figure 3A:
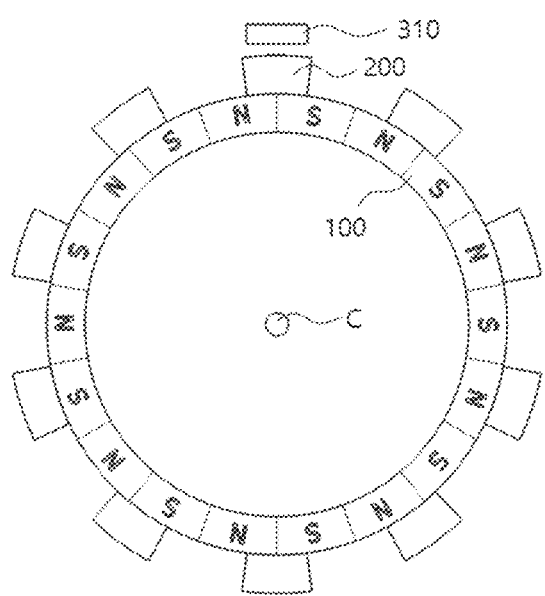
FIG. 3A and FIG. 3B are schematic views of rotation of an absolute position detection device of a rotating body using a magnetic material according to the first exemplary embodiment of the present disclosure.
Figure 3B:
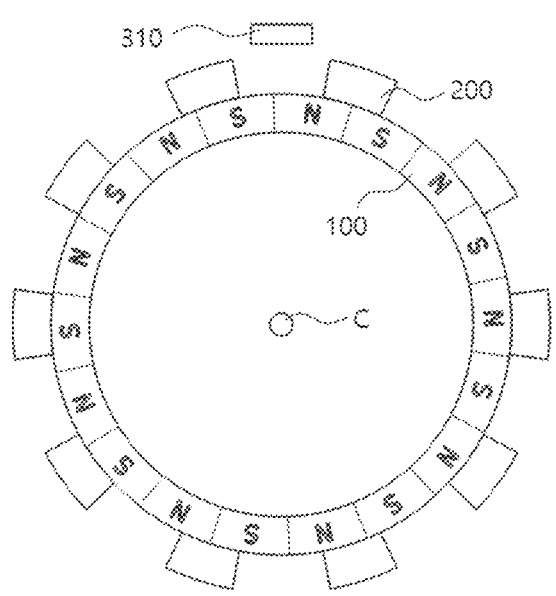

FIG. 3A and FIG. 3B show a case where the absolute position detection device of a rotating body using a magnetic material according to the first exemplary embodiment of the present disclosure shown in FIG. 2 rotates so that the magnetic material 200 is located between the first Hall sensor 310 and the magnet 100 and a case where the magnetic material 200 is not located between the first Hall sensor 310 and the magnet 100.

As shown in FIG. 3A, when the magnetic material 200 is located between the first Hall sensor 310 and the magnet 100, a magnetic field generated by the magnet 100 is expanded by the magnetic materials 200 and the first Hall sensor 310 detects a change in magnetism due to the rotation of the magnet 100 and outputs a signal. As shown in FIG. 3B, when the magnetic material 200 is not located between the first Hall sensor 310 and the magnet 100, the magnetic field generated by the magnet 100 is not expanded by the magnetic material 200 and the first Hall sensor 310 detects a change in magnetism due to the rotation of the magnet 100 and does not output a separate signal.

Figure 4:
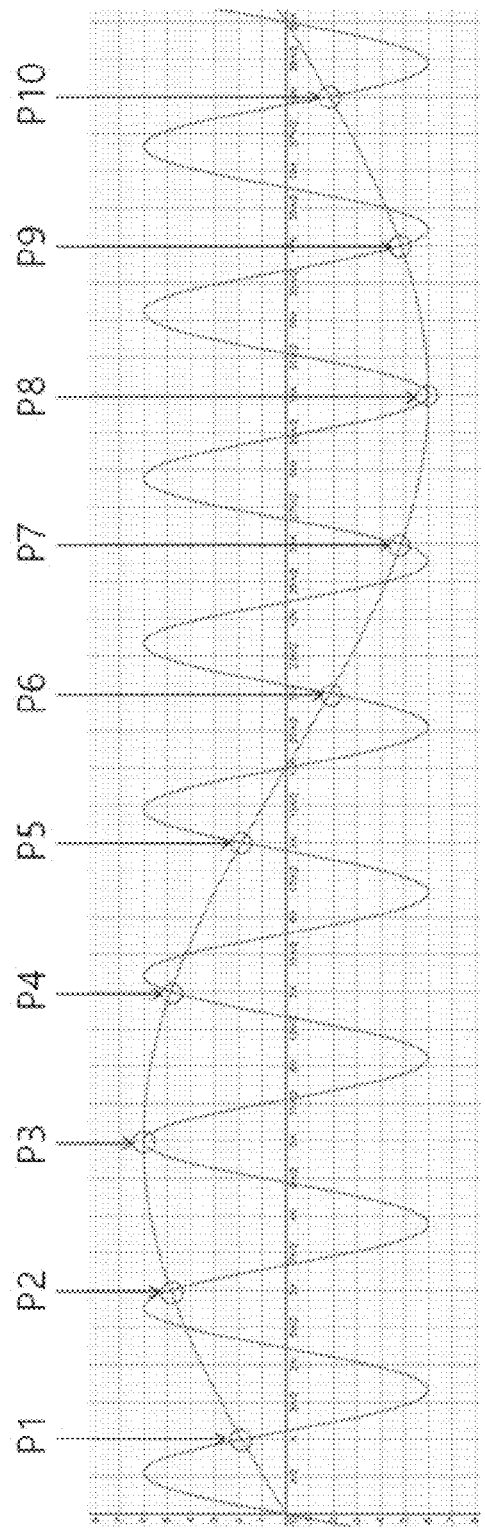
FIG. 4 is a graph of a signal output according to a change in magnetism based on rotation of magnets in the absolute position detection device of a rotating body using a magnetic material according to the first exemplary embodiment of the present disclosure.

FIG. 4 shows signals that may be output according to a change in magnetism according to the rotation of the magnet 100. If the first Hall sensor 310 is installed close enough to the magnet 100 to detect a change in magnetism according to the rotation of the magnet 100 without the magnetic material 200, the first Hall sensor 310 may output a signal in the form of a sine wave having 10 periods shown in FIG. 4. However, in this exemplary embodiment, since the first Hall sensor 310 is spaced apart from the magnet 100 by a predetermined interval as described above, the first Hall sensor 310 may detect a change in the magnetism of the magnet 100 limitedly according to the position of the magnetic material 200. Since the spacing between the plurality of magnetic materials 200 included in this exemplary embodiment is constant, if a rotational speed of the rotating body is constant, a time interval for the magnetic material 200 to be located between the magnet 100 and the first Hall sensor 310 will also be constant. Therefore, while the rotating body rotates once, as many as 10 signals, which is the number of the magnetic materials 200, may be input to the first Hall sensor 310, and the signals may be some of the signals generated by the illustrated magnets 100. In FIG. 4, first to tenth intersections P1 to P10, which are 10 signals, are indicated by black circles, and the first intersection P1 to the tenth intersection P10 are output at predetermined intervals on the sine wave signal based on the magnet 100.

Although not shown in the drawings, the absolute position detection device of a rotating body using a magnetic material according to the first exemplary embodiment of the present disclosure may further include a controller. The controller measures an absolute position of the rotating body using the signal detected by the first Hall sensor 310. Since the controller is configured for signal processing, it may be implemented as a device or component capable of calculation such as a microprocessor and may be electrically connected with the first Hall sensor 310 to receive the signal output from the first Hall sensor 310.

Hereinafter, a method of measuring an absolute position using a signal output from the first Hall sensor 310 by the controller will be described. The controller generates a primary harmonic with a cycle of one rotation time of the rotating body by connecting first to tenth intersection points P1 to P10, which are signals output from the first Hall sensor 310, to each other. In FIG. 4, the primary harmonic is represented in green, and since the primary harmonic is in the form of a sine wave with a period of 20 pi, the controller may measure an absolute position of the rotating body using a value of the primary harmonic at the time of measurement.

Although the rotating body rotates once and all the magnetic materials 200 are not located between the magnets 100 and the first Hall sensor 310, the controller may estimate the primary harmonic using at least two intersection points output from the first Hall sensor 310. This is because, since the period of the primary harmonic is the same as the time for the rotating body to rotate once and the number of the pole pairs included in the magnets 100 and the number of the magnetic materials 200 are already known, a rotation speed may be measured using the number/time interval of signals detected by the first Hall sensor 310 through the magnetic materials 200 so that the period of the primary harmonic may be known, an amplitude of the primary harmonic does not exceed a maximum value of the signal output from the first Hall sensor 310, and the primary harmonic appears in the form of a sine wave. Therefore, the primary harmonic may be estimated using signals generated by two different magnetic materials 200 in succession. Specifically, the primary harmonic may be estimated according to whether the signal from the first Hall sensor 310 that is continuously output is a positive value, a negative value, an increasing type, or a decreasing type. Using this method, in the present disclosure, the primary harmonic may be estimated to detect the absolute position of the rotating body even if some of the magnets are damaged.

The absolute position detection device of a rotating body using a magnetic material having the structure as described above has the effect of detecting the primary harmonic using the magnetic material and the first Hall sensor and detecting the absolute position of the rotating body using the primary harmonic, and thus may be applied to various fields. In addition, since the absolution position of the rotating body is detected without configuring the magnets in two rows, thus having an effect of improving economical efficiency of the absolute position detection device of a rotating body through the relatively simple structure.

Second Embodiment

Figure 5:
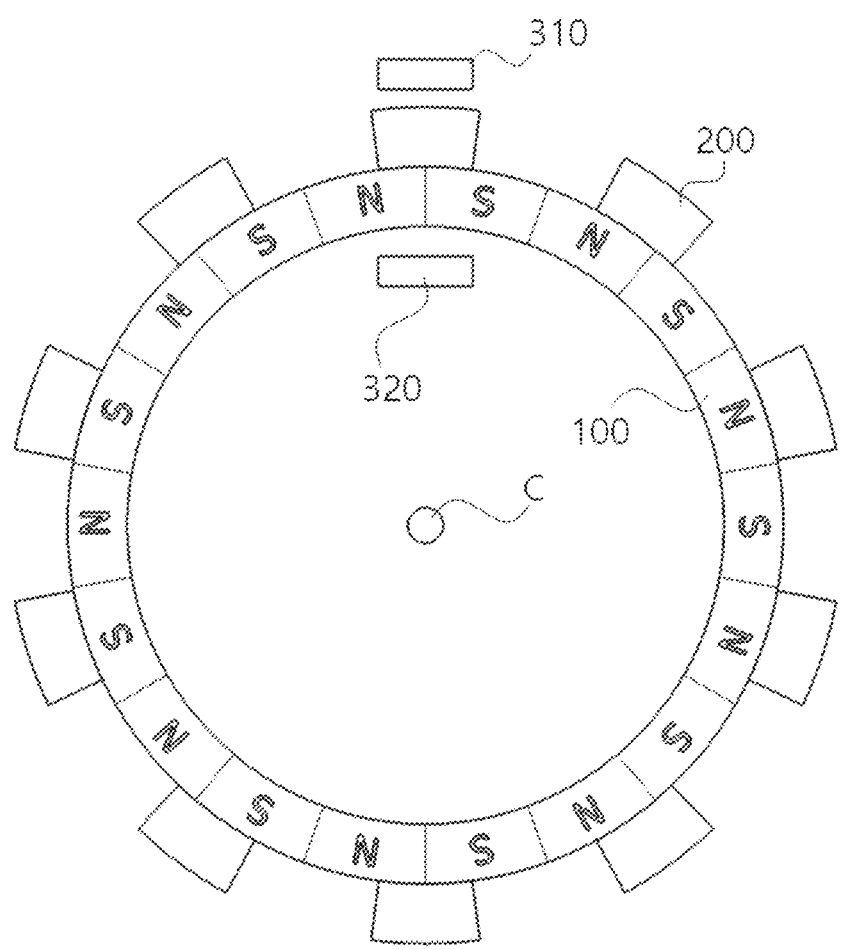
FIG. 5 is a schematic diagram of an absolute position detection device of a rotating body using a magnetic material according to a second exemplary embodiment of the present disclosure.

FIG. 5 schematically shows an absolute position detection device of a rotating body using a magnetic material according to a second exemplary embodiment of the present disclosure.

As shown in FIG. 5, the absolute position detection device of a rotating body using a magnetic material according to a second exemplary embodiment of the present disclosure is the same as the absolute position detection device of a rotating body using a magnetic material according to the first exemplary embodiment of the present disclosure, except for addition of the second Hall sensor 320. Therefore, when describing the absolute position detection device of a rotating body using a magnetic material according to the second exemplary embodiment of the present disclosure, only the second Hall sensor 320 showing a difference from the first exemplary embodiment and the configuration related thereto will be described in detail. Other components are assumed to be identical to each other.

As shown in FIG. 5, the second Hall sensor 320 is installed adjacent to the magnet 100 to detect a change in magnetism according to the rotation of the magnet 100 and output a signal. The signal output from the second Hall sensor 320 may be a red signal shown in FIG. 4, and the controller may increase accuracy of the measured absolute position of the rotating body and improve resolution of the detection device itself by comparing the signal output from the first Hall sensor 310 and the signal output from the second Hall sensor 320 with each other or by correcting the signal output from the first Hall sensor 310 using the signal output from the second Hall sensor 320.

Third Embodiment

Figure 6A:
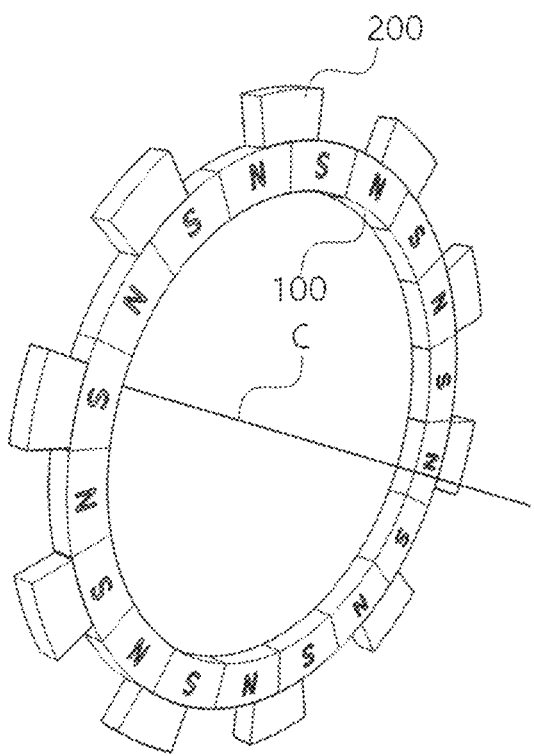
FIG. 6A and FIG. 6B are perspective views of an absolute position detection device of a rotating body using a magnetic material according to the first exemplary embodiment of the present disclosure and an absolute position detection device of a rotating body using a magnetic material according to a third exemplary embodiment of the present disclosure.
Figure 6B:
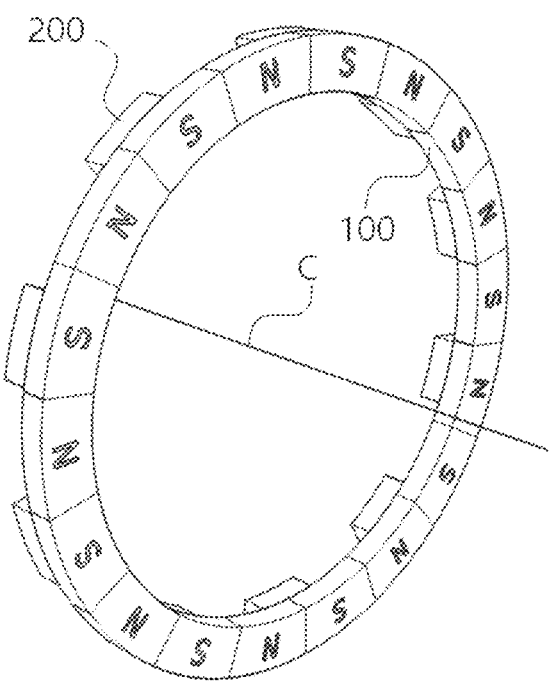

FIG. 6A and FIG. 6B show the absolute position detection device of a rotating body using a magnetic material according to the First exemplary embodiment of the present disclosure and the absolute position detection device of a rotating body using a magnetic material according to a third exemplary embodiment of the present disclosure.

In the absolute position detection device of a rotating body using a magnetic material according to the first exemplary embodiment of the present disclosure shown in FIG. 6A, the magnets 100 and a plurality of magnetic materials 200 are formed in succession in the circumferential direction around the rotation axis C, whereas, in the absolute position detection device of a rotating body using a magnetic material according to the third exemplary embodiment of the present disclosure shown in FIG. 6B, the magnets 100 and a plurality of magnetic materials 200 are formed in the direction of the rotation axis C. Although the first Hall sensor is not shown in the drawing, the first Hall sensor may be installed at a location at which the first Hall sensor may detect magnetism based on the magnet 100 and output a signal when the magnetic material 200 approaches, and may be installed at a location at which the first Hall sensor may not be able to detect magnetism based on the magnet 100 and output a signal when the magnetic material 200 moves away, regardless of the exemplary embodiment.

Hereinafter, the absolute position detection method of a rotating body using a magnetic material according to the first exemplary embodiment of the present disclosure will be described in detail.

The absolute position detection method of a rotating body using a magnetic material according to the first exemplary embodiment of the present disclosure may be performed by the absolute position detection device of a rotating body using a magnetic material according to the first exemplary embodiment of the present disclosure.

The absolute position detection method of a rotating body using a magnetic material according to the first exemplary embodiment of the present disclosure may include operations a) and b).

In operation a), the first Hall sensor 310 is spaced apart from the magnet 100 by a predetermined interval, and when the magnetic material 200 is located in a space between the magnet 100 and the first Hall sensor 310, the first Hall sensor 310 outputs a signal.

In operation b), an absolute position of the rotating body is measured by detecting a primary harmonic with a cycle of one rotation time of the rotating body using the signal output from the first Hall sensor 310. The primary harmonic occurs because the number of pole pairs included in the magnets 100 and the number of magnetic materials 200 are different by one. In operation b), the primary harmonic may be estimated using at least two of the values of the signal output from the first Hall sensor.

The absolute position detection method of a rotating body using a magnetic material according to the first exemplary embodiment of the present disclosure may further include operation a-1) performed between operations a) and b).

In operation a-1), the second Hall sensor 320 installed to be spaced apart from the magnet 100 by a predetermined interval detects a change in magnetism according to the rotation of the magnet 100 and outputs a signal. In operation b), an absolute position of the rotating body is measured by detecting a primary harmonic using the signal output from the first Hall sensor 310 and the signal output from the second Hall sensor 320. The present disclosure further includes operation a-1) to correct the signal output from the first Hall sensor 310 using the signal output from the second Hall sensor 320, so that the absolute position of the rotating body may be more accurately measured by complementing the measured values in measuring the absolute position of the rotating body.

According to the absolute position detection device and detection method of a rotating body using a magnetic material according to various exemplary embodiments of the present disclosure as described above, since the number of pole pairs of the magnets included in the magnets and the number of magnetic materials are different by one, the primary harmonic with a cycle of one rotation time of the rotating body may be detected and an absolute position of the rotating body may be measured using the primary harmonic.

In addition, according to the present disclosure, by measuring the absolute position of the rotating body by detecting the primary harmonic using the magnets and the magnetic materials in a row and the first Hall sensor, economical efficiency may be improved by configuring the detection device through a relatively simple structure.

The present disclosure is not limited to the exemplary embodiments described above, application ranges are diverse, and various modifications may be made without departing from the scope of the present disclosure as claimed in the claims.

What is claimed is:

1. An absolute position detection device comprising:
   magnets coupled to a rotating body and configured to rotate together with the rotating body and having n pole pairs, wherein n is a natural number;
   (n+1) magnetic materials arranged adjacent to the magnets, spaced apart from each other by a predetermined interval, and configured to rotate together with the rotating body;
   a first Hall sensor spaced apart from the magnets, installed to allow the magnetic materials to rotate in a space between the first Hall sensor and the magnets and configured to output a first signal based on the magnets when the magnetic materials approach the first Hall sensor; and
   a controller configured to measure an absolute position of the rotating body using the first signal,
   wherein the controller is further configured to measure the absolute position of the rotating body by detecting a primary harmonic with a cycle of one rotation time of the rotating body using the first signal.

2. The absolute position detection device of claim 1, wherein the controller is further configured to measure the absolute position of the rotating body by estimating the primary harmonic using at least two of the values of the first signal.

3. The absolute position detection device of claim 1, further comprising:
   a second Hall sensor installed adjacent to the magnets to detect a change in magnetism according to rotation of the magnets and configured to output a second signal,
   wherein the controller is further configured to measure the absolute position of the rotating body using the first and second signals.

4. The absolute position detection device of claim 1, wherein the magnets and the magnetic materials are arranged in a direction of a rotation axis.

5. The absolute position detection device of claim 4, wherein the magnets and the magnetic materials are arranged in an outer circumferential direction about the rotation axis.

6. An absolute position detection method of a rotating body using magnets coupled to the rotating body to rotate and having n pole pairs and (n+1) magnetic materials installed adjacent to the magnets and spaced apart from each other by a predetermined interval, wherein n is a natural number, the absolute position detection method comprising:
   outputting a first signal, by a first Hall sensor spaced apart from the magnets and installed to allow the magnetic materials to rotate in a space between the magnets and the first Hall sensor, based on the magnets when the magnetic materials approach the first Hall sensor; and
   measuring an absolute position of the rotating body by detecting a primary harmonic with a cycle of one rotation time of the rotating body using the first signal.

7. The absolute position detection method of claim 6, wherein the absolute position of the rotating body is measured by estimating the primary harmonic using at least two of the values of the first signal.

8. The absolute position detection method of claim 6, further comprising:
   outputting a second signal, prior to the measuring, by a second Hall sensor which is spaced apart from the magnets by a predetermined interval and detects a change in magnetism according to rotation of the magnets, wherein the absolute position of the rotating body is measured by detecting the primary harmonic using the first and second signals.

* * * * *